THIS IS IN PLACE OF A BLUE SHEET!

DO NOT REMOVE

DO NOT SCAN

H. A. KELLY.
REPAIR LINK.
APPLICATION FILED MAR. 9, 1917.
1,254,143.
Patented Jan. 22, 1918.
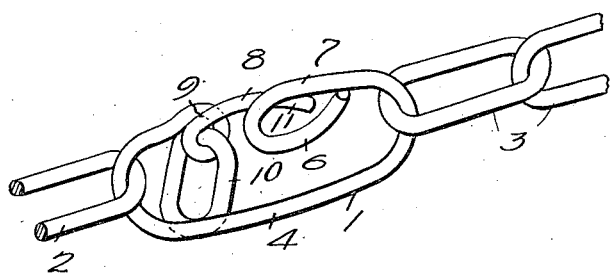
H. A. Kelly
Inventor
By Geo. P. Kimmel.
Attorney